United States Patent

[11] 3,614,786

| [72] | Inventor | William B. Goggins, Jr.<br>Dayton, Ohio |
|---|---|---|
| [21] | Appl. No. | 868,438 |
| [22] | Filed | Oct. 22, 1969 |
| [45] | Patented | Oct. 19, 1971 |
| [73] | Assignee | The United States of America as represented by the Secretary of the Air Force |

[54] DUAL HARMONIC FREQUENCY MOVING TARGET INDICATOR RADAR
2 Claims, 1 Drawing Fig.

[52] U.S. Cl. ............................................ 343/7.7,
343/8
[51] Int. Cl. ........................................ G01s 9/42,
G01s 9/44

[50] Field of Search............................................ 343/7.7, 8, 9

[56] References Cited
UNITED STATES PATENTS
2,695,995 11/1954 Cauchois...................... 343/9
3,317,909 5/1967 Waetjen....................... 343/8

Primary Examiner—Malcolm F. Hubler
Attorneys—Harry A. Herbert, Jr. and George Fine ABSTRACT: A radar system in which a dual harmonic frequency phase signature technique is applied to a radar system which uses doppler frequency to discriminate moving targets from stationary targets.

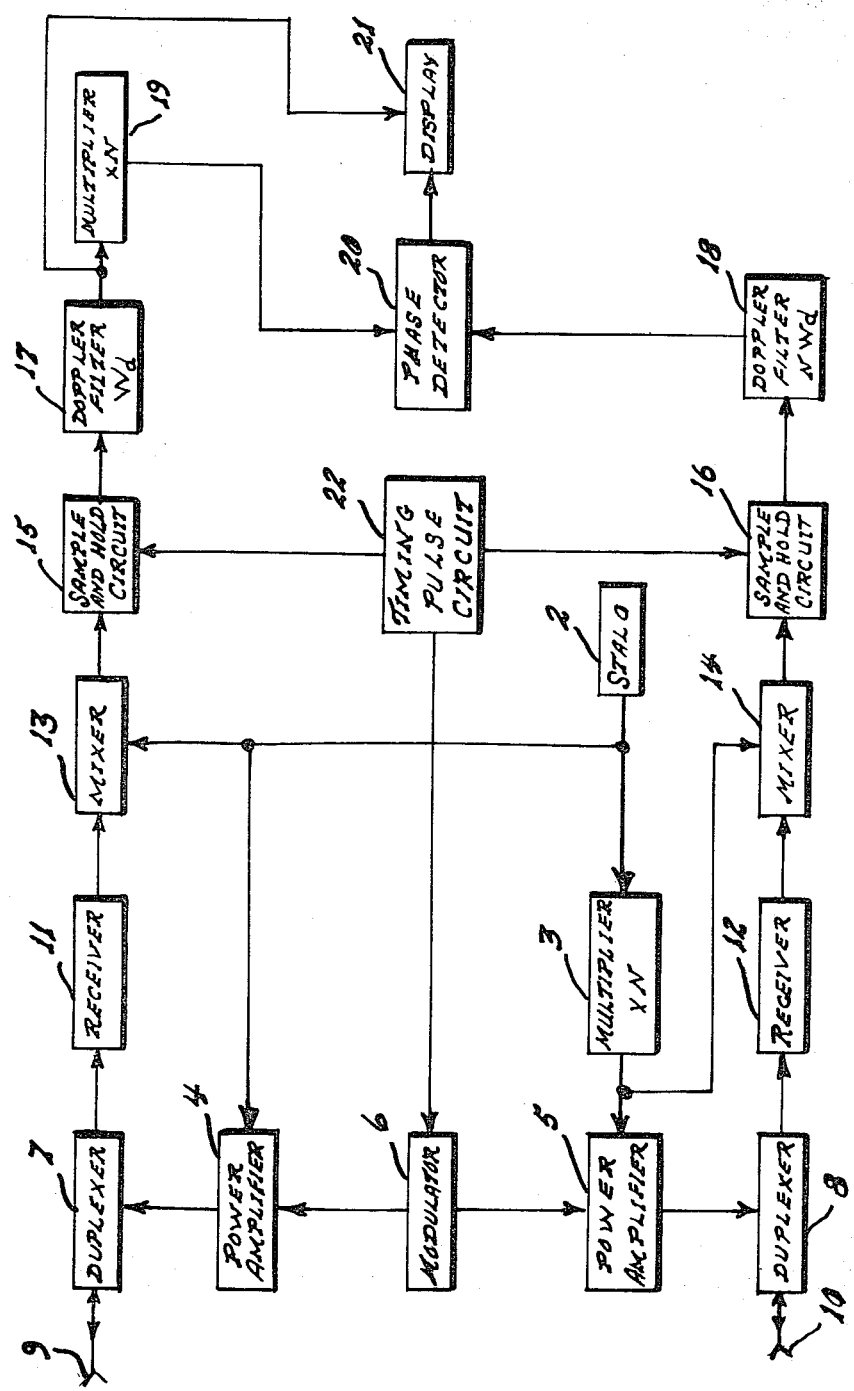

DUAL HARMONIC FREQUENCY MOVING TARGET INDICATOR RADAR

BACKGROUND OF THE INVENTION

This invention relates to radar systems and more particularly to a radar using dual harmonic phase comparison with an MTI radar.

An MTI radar is a system which differentiates between fixed and moving targets by detecting the change in frequency of the reflected wave caused by doppler effects. The system can also measure target velocity with high accuracy. The prior art MTI, however, did not include a technique or means to utilize phase information to provide target identification.

With the phase of radar targets being a unique function of frequency, evaluation of this phase will aid in identifying these targets by their radar returns. Characteristic phase information cannot be used to enhance targets buried in noise as is done by processing Doppler information, but it is additional and valuable information which can be extracted from MTI radars. Thus the use of dual harmonic frequency phase comparison with MTI radar systems solves the problem of identifying or classifying moving targets by use of this phase signature.

SUMMARY OF THE INVENTION

A dual harmonic frequency phase signature technique is applied to a radar system which uses doppler frequency to discriminate moving targets from stationary targets. The dual harmonic frequency phase technique provides a characteristic phase signature of the moving target which solves the problem of identifying or classifying a moving target by use of this phase signature. In addition to the phase signature, the radar system of the present invention provides range and velocity information as to the moving target.

An object of the present invention is to provide an MTI radar system which applies a dual harmonic frequency phase signature technique to an MTI radar.

These and other advantages, features and objects of the invention will become more apparent from the following description taken in connection with the illustrative embodiment in the accompanying drawing, wherein:

DESCRIPTION OF THE DRAWINGS

The FIGURE shows a block diagram of the dual harmonic frequency moving target indicator radar of the present invention.

DESCRIPTION OF THE PREFERRED EMBODIMENT

The invention can best be understood by first of all considering the operation of an ordinary MTI doppler radar. If a radar transmits a pulsed waveform $T = \cos \omega_1 t$ and this waveform illuminates a moving target, the received pulses will be $R = \cos(\omega_1 t + \omega_d t + 4\pi R_o + \varphi_{c_1})$ where $\omega_d$ is the doppler frequency caused by target motion, $\varphi_{c_1}$ is the phase shift due to target characteristics and $R_o$ is target range. The doppler frequency is given by $\omega_d = 4\pi v/\lambda$.

In a conventional MTI radar doppler, filters are used to discriminate against the various doppler frequencies and thus to discriminate against the various doppler frequencies and thus to discriminate moving targets from stationary targets.

To understand how this can be used with the dual harmonic frequency radar system, refer to the single FIGURE of this invention. Stable oscillator 2 generates a signal of constant frequency $\omega_1$ This is multiplied in frequency up to $N\omega_1$ by multiplier 3. Power amplifiers 4 and 5 which are pulsed by modulator 6 amplify both frequencies $\omega_1$ and $N\omega_1$, respectively. The simultaneous pulsed signals are passes through duplexers 7 and 8 to antennas 9 and 10, respectively. Antennas 9 and 10 direct the pulses toward a moving target. The simultaneously pulsed signals are of the forms $T_1 = \cos \omega_1 t$ $T_2 = \cos N\omega_1 t$. The received signals from the moving target by way of antennas 9 and 10 and duplexers 7 and 8, are of the form:

$$R_1 = \cos\left(\omega_1 t + \omega_d t + \frac{4\pi R_0}{\lambda} \varphi \varphi_{c_1}\right)$$

$$R_2 = \cos\left(N\omega_1 t + N\omega_d t + \frac{4\pi N R_0}{\lambda} + \varphi_{c_2}\right).$$

These are amplified by receivers 11 and 12 and are mixed with the original transmitted frequency $\omega_1$ in mixer 13 and with the multiplied frequency $N\omega_1$ in mixer 14. Using the difference frequency out of the mixers, we have $$P_1 = \cos\left(\omega_d t + \frac{4\pi R_0}{\lambda} + \varphi_{c_1}\right)$$

$$P_2 = \cos\left(N\omega_d t + \frac{4N\pi R_0}{\lambda} + \varphi_{c_2}\right).$$

The doppler frequency is $\omega_d$ and depends on the target velocity. These two signals pass through sample and hold circuits 15 and 16 which sorts the targets in range. The target range depends on the time after transmission that the sampling is done. They then go to doppler filters 17 and 18, one tuned to $\omega_d$ and one to $N\omega_d$, respectively. The output of doppler filter 17 contains range and velocity information. This is sent to display 21. The signal from lower frequency doppler filter 17 is multiplied in multiplier 19 in frequency by $N$ to yield $$P_1{}^1 = \cos\left(N\omega_d t + \frac{4N\pi R_0}{\lambda} + N\varphi_{c_1}\right).$$

This is compared in phase by phase detector 20 with the output of higher frequency filter 18 to yield $\Phi = N\varphi_{c_1} + \varphi_{c_2}.$ This signal is sent to display 21 which could be a color oscilloscope which displays target range on the $x$-axis, target velocity on the $y$-axis, target strength as intensity and target characteristic phase, $\Phi$, as color.

It is emphasized that sample and hold circuits 15 and 16 receive a predetermined timing pulse from timing pulse circuit 22 to provide the appropriate timing. Simultaneously, modulator 6 also receives the timing pulse from timing pulse circuit 22. Timing pulse circuit 22 is a conventional timing pulse generator.

It is noted that the output of doppler filter 17 provides range and target information from the moving target. The output from phase detector 20 provides phase characteristic signature information of the moving target to identify or classify the moving target. The outputs may be utilized in a single conventional radar display or each output may be utilized in a separate conventional radar oscilloscope display.

I claim:

1. A dual harmonic frequency moving target indicator radar comprising means to generate a stable first continuous wave signal of a first predetermined frequency, first means to multiply said first continuous wave signal by a frequency factor of $N$ to provide a second continuous wave signal of a second predetermined harmonic frequency, modulator means to pulse said first and second pulsed signals, first and second means to direct said first and second pulsed signals toward a moving target to provide return signals therefrom, first and second means to receive said return signals, first and second mixers receiving the first mixer receiving simultaneously said first continuous wave signal and said second mixer receiving simultaneously said second continuous wave signal, first and second sample and hold circuits receiving the outputs from said first and second mixers, respectively, a timing pulse circuit providing a predetermined timing pulse to said sample and hold circuits and said modulator means, first and second doppler filters said first doppler filter being tuned to said first predetermined frequency and said second to said second predetermined harmonic frequency, said first doppler filter providing an output signal representative of the target velocity of said moving target, second means to multiply the output of said first doppler frequency by a factor, N, and a phase detector receiving simultaneously the outputs from said second multiplier and said second doppler filter to provide characteristic signal of said moving target for classification purposes.

2. A dual harmonic frequency moving target indicator radar as described in claim 1 further including first and second means to amplify said first and second pulsed signals, respectively.